Dec. 8, 1970                P. PENSABENE                3,545,889
                           CENTRIFUGAL PUMPS
                          Filed Oct. 21, 1968
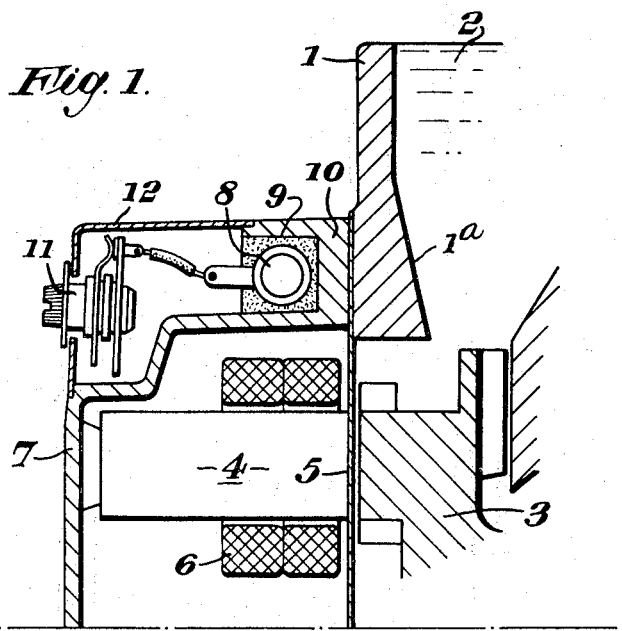
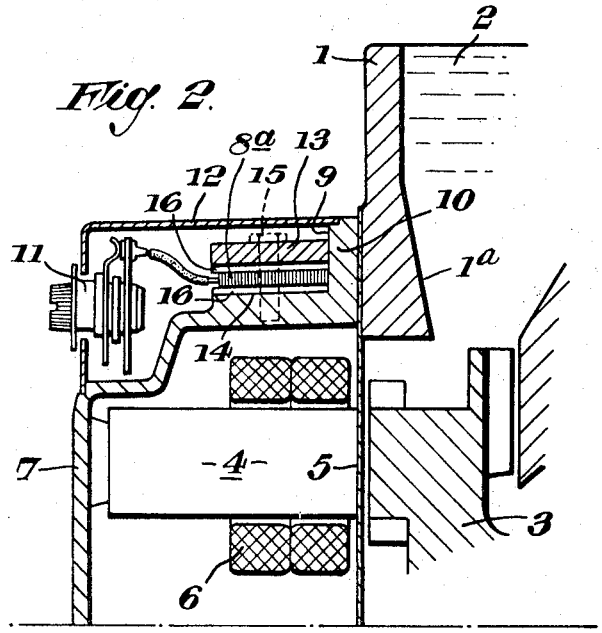
INVENTOR
PHILIP PENSABENE United States Patent Office 3,545,889
Patented Dec. 8, 1970

3,545,889
CENTRIFUGAL PUMPS
Philip Pensabene, Bridgwater, Somerset, England, assignor to Sealed Motor Construction Company Limited, Bridgwater, Somerset England
Filed Oct. 21, 1968, Ser. No. 769,092
Claims priority, application Great Britain, Nov. 16, 1967, 52,272/67
Int. Cl. F04d 13/02; H02k 1/22
U.S. Cl. 417—366                                   1 Claim

ABSTRACT OF THE DISCLOSURE

For varying the head to output ratio of an electric motor driven water circulating pump unit while at the same time increasing the overall efficiency, there is provided in the stator winding circuit of the motor an adjustable resistance device having at least one resistance element mounted on the unit in heat conducting connection with the water circulating channel therein.

BACKGROUND OF INVENTION

This invention relates to centrifugal pumps and particularly to pumps constructed as electric motorised units for use in hot water circulating systems. A typical motorised pump unit may employ an electric disc or drum type motor or a shaded pole motor, and the invention is particularly directed to controlling the performance of pump units driven by A.C. induction motors.

Various arrangements have been provided in the past for varying the head to output ratio of a water circulating pump to suit the conditions of the particular site requirements of the installation. Such arrangements have usually involved a re-design in the mechanical components of the pump, and it is the object of the invention to avoid mechanical design modifications by the simple provision of an electrical control within a casing portion of the pump or motor, the control being so arranged as to enable the pump performance to be varied as required, while any heat generation in the control can be dissipated within the pump casing to provide useful heating of the water circulating in the pump.

SUMMARY OF INVENTION

According to the invention an electric motorised centrifugal pump unit driven by an A.C. induction motor has the stator winding provided with a resistance control device of which at least one resistance control element is embodied within and in heat conducting connection with a casing portion of the unit and in a position adjacent to the water circulating channel of the pump.

The embodied resistance control element may be a single or a multi-section fixed or variable resistance and may be connected in series or parallel with the stator winding of the motor. Adjustment of the effective resistance value in the stator winding circuit of the motor may be provided by a rotary switch or a plugging device or a push-on terminal arrangement, so connected as to vary sections of the resistance so that respective sections may be brought into use as required, or a separate variable control network may be connected to the embodied resistance element to enable the effective resistance in the stator circuit of the motor to be varied from a remote point for altering speed of the pump. The adjustment means referred to may be mounted in the motorised unit or may be constructed as a remote control.

The A.C. electric motor preferred for this invention is one which has a low flux high leakage arrangement, providing a similar characteristic to a commutator type series wound motor where the speed falls steadily to zero and does not have any specific pull-out point. The high leakage drum-type, disc-type or shaded pole motor is particularly suited to the control device of the invention.

By the integration of at least one of the resistance control elements within the unit, any excessive heat generated by the resistance element during the controlling operation disperses through the casing of the unit and may therefore be absorbed by the water flowing through the pump circulating channel, thereby improving the efficiency, because normally such heat would be a total loss.

Arising from this improved form of regulation provided by this invention there is firstly the feature that as the resistance value increases the input power is reduced, and secondly as the speed of the motor reduces the overall noise level of the unit is correspondingly reduced, the latter being a particularly important factor in the application to circulating pumps for central heating systems where it is desirable to keep noise to a minimum in the water channels.

BRIEF DESCRIPTION OF THE DRAWINGS

Examples of preferred embodiments of the invention will now be described with reference to the accompanying drawing, in which:

FIG. 1 shows in cross-section one example of the stator end of a typical centrifugal pump unit with one form of single element resistance forming a part of the control device with an adjustable switch for varying the resistance mounted on the unit casing, and FIG. 2 is a similar view to FIG. 1, but with an alternative form of resistance element.

The drawing shows the invention applied to a glandless circulating pump suitable for water circulating systems, the A.C. motor being of the disc type such as that shown, for example, in a centrifugal pump unit disclosed in British patent specification No. 978,683.

DESCRIPTION OF PREFERRED EMBODIMENTS

In the drawing, the pump casing 1 has a water channel 2 leading to the rotor impeller 3 which is separated from the stator 4 of the electric motor by a shroud in the form of a flat disc 5. The stator is enclosed by a winding 6 adapted for connection in an appropriate electric circuit (not shown). The stator assembly is enclosed by a motor casing part 7 which is secured in any suitable manner to the pump casing part 1.

The control device for controlling the flow of electric current through the stator winding of the motor includes a resistance element 8 which in FIG. 1 is secured (for example by being cemented) into a housing 9 in a portion 10 of the motor casing 7, this casing portion 10 being located as shown, adjacent to the wall 1a of the water flow channel 2 and fixed in heat conducting contact therewith, so that any heat generated in the housing 9 from the resistance element 8 is dissipated through the casing parts 10, 1a, into the water circulating in the channel 2. The resistance element 8 in the arrangement shown is connected to switching means 11 which enables sections of the resistance element to be varied or brought into use as may be required for controlling the speed of the motor. It will be understood, however, that this switching means is essentially typical of only one aspect of the invention, which may employ any suitable form of control including a stator control circuit with one or more external resistances which may be in parallel or in series with the heat conducting resistance element 8, and which provide adjustment enabling the current flow to be varied in the stator winding by appropriate adjustment of the variable element(s) of the control circuit.

As has been indicated hereinbefore, the type of motor may be as suitable for the purpose of the particular application of the unit, but generally it will be a disc type motor as shown, or a conventional drum type including a shaded pole motor. Furthermore, a separate control box mounted away from the unit but connected electrically with the resistance element therein may be employed to give the remote control indicated above.

It will be understood that the resistance control element which is mounted adjacent to the water channel of the pump may in fact be embodied in heat conducting connection in the pump casing part 1, and there may be one or more of these resistance control elements distributed in any suitable casing part for the purpose of dissipating heat to the water channel, as may be required. Furthermore, appropriate conducting channels or members may be associated with the housing for the resistance element or elements 8 to give an improved heat conduction if this is found to be necessary or desirable; one form of this modification is shown in FIG. 2.

The switching arrangement of the control device for bringing in the resistance element(s) 8 may, as shown, be mounted in any suitable position on the motor casing or the pump casing, and in general will be enclosed by an appropriate housing cover such as 12.

In FIG. 2 an alternative method of mounting the resistance element 8 is shown. In this case the element 8 is a flat unit and instead of cementing it into the housing 9, the latter is constituted on one side by a clamping plate 13, and the flat resistance element 8a is clamped between the plate 13 and a parallel clamping surface 14 of the housing 9 in the motor casing 7, by, for example, a screw clamp 15, the arrangement being such that intimate heat conducting contact is obtained between the various parts to provide effective heat transference to the water channel 2. To assist this contact, machined flat surfaces 16 may be interposed between the flat resistance element 8a and the clamping surfaces, or other suitable heat conducting members may be provided.

I claim:

1. A centrifugal pump unit comprising a casing embodying a water circulation channel and enclosing an A.C. induction motor of the disc type having a wound stator and a rotor impeller, said stator being separated from the impeller by a shroud in said casing which forms part of said water channel, said casing having a part which encloses the stator and which is provided with a resistance housing portion in heat exchange connection with a wall of the said water channel, and an adjustable resistance control device for controlling electric current flow through the stator winding, said device having at least one resistance element mounted in said housing portion to effect transfer of heat through said wall when current flows through the resistance element.

References Cited

UNITED STATES PATENTS

| | | | |
|---|---|---|---|
| 2,707,440 | 5/1955 | Long et al. | 103—97X |
| 2,782,721 | 2/1957 | White | 103—87 |
| 3,262,394 | 7/1966 | Smith et al. | 103—97X |
| 3,364,866 | 1/1968 | Sato | 103—87 |

ROBERT M. WALKER, Primary Examiner

U.S. Cl. X.R.

310—268; 417—420